United States Patent [19]
Kuriyama et al.

[11] 3,888,646
[45] June 10, 1975

[54] PROCESS FOR PRODUCING SPECIAL FILTER

[75] Inventors: Takayuki Kuriyama; Motohiko Yagi, both of Odawara, Japan

[73] Assignee: Fuji Photo Film Co., Ltd., Ashigara, Japan

[22] Filed: Dec. 3, 1973

[21] Appl. No.: 421,172

[30] Foreign Application Priority Data
Dec. 1, 1972 Japan.............................. 47-120460

[52] U.S. Cl. ..................... 65/18; 65/30; 65/32; 106/53; 106/54; 106/62; 264/1; 350/311; 350/312

[51] Int. Cl.. C03b 23/20; G02b 27/02; C03b 35/04

[58] Field of Search ..................... 65/18, 30, 81, 32; 350/312, 311; 264/1; 106/53, 54, 62

[56] References Cited
UNITED STATES PATENTS

| | | | |
|---|---|---|---|
| 3,459,503 | 8/1969 | Roy et al. ........................... | 65/18 X |
| 3,531,308 | 9/1970 | Bagley .............................. | 65/18 X |
| 3,586,417 | 6/1971 | Fields............................... | 350/312 |
| 3,767,745 | 10/1973 | Gazza ............................... | 65/33 X |

OTHER PUBLICATIONS

Smithsonian Miscellaneous Collections, Vol. 93, No. 7, The Christiansen Light Filter; Its Advantages and Limitations, by McAlister, Published by the Smithsonian Institution, April 2, 1935, pps. 1 to 14.

*Primary Examiner*—Robert L. Lindsay, Jr.
*Assistant Examiner*—Frank W. Miga
*Attorney, Agent, or Firm*—Sughrue, Rothwell, Mion, Zinn & Macpeak

[57] ABSTRACT

A glass composite having utility as a Christiansen filter comprising a glass matrix having dispersed therein glass particles having the same refractive index as the glass matrix at one wavelength of light but a different refractive index at other wavelengths and a process for its preparation.

5 Claims, 2 Drawing Figures

3,888,646

PROCESS FOR PRODUCING SPECIAL FILTER

BACKGROUND OF THE INVENTION

1. Field of the Invention

The present invention relates to a process for producing a special filter which has optical properties similar to the optical properties of a Christiansen filter. The special filter of the present invention is easy to handle, is hardly influenced by a change in temperature and can be treated in the same manner as glass.

2. Description of the Prior Art

A mixture prepared by dispersing, in a liquid, fine particles of a solid which shows the same refractive index as that of the liquid at a specific wavelength but shows different refractive index at other wavelength is optically homogeneous and appears transparent to light of this specific wavelength since the refractive index of the liquid and that of the solid are the same at this specific wavelength and no scattering of light results. On the other hand, to the light of other wavelengths, the mixture is optically heterogeneous and appears opaque since the refractive indices of the liquid and the solid are different from each other, resulting in a scattering of light.

A filter prepared by placing a liquid in a transparent cell and dispersing therein fine particles of a solid, utilizing the abovedescribed phenomenon, is well known as a Christiansen filter. By changing the combination of the liquid and the solid fine particles dispersed therein, light having specific and neighboring wavelengths can be selectively removed from incident light as desired.

However, since the conventionally known Christiansen filter comprises a liquid and finely pulverized solid, the finely pulverized solid is difficult to uniformly disperse in the liquid due to settling, agglomeration or movement of the finely pulverized solids and the resulting filter is difficult to handle. In addition, since a liquid undergoes great changes in refractive index with the changes in temperature, the filter has the disadvantage that the wavelength at which the filter shows maximum percent transmission varies greatly depending upon the temperature.

SUMMARY OF THE INVENTION

The present invention relates to a process for producing an absolutely novel special filter comprising a glass composite prepared by uniformly dispersing, in a glass matrix, particles of a glass which is different from the glass matrix and which exhibits the same refractive index as that of the glass matrix to light of a specific wavelength but which exhibits a different refractive index to light of other wavelengths, the glass composite showing maximum percent transmission to light of around the specific wavelength.

DETAILED DESCRIPTION OF THE INVENTION

Figure 1:
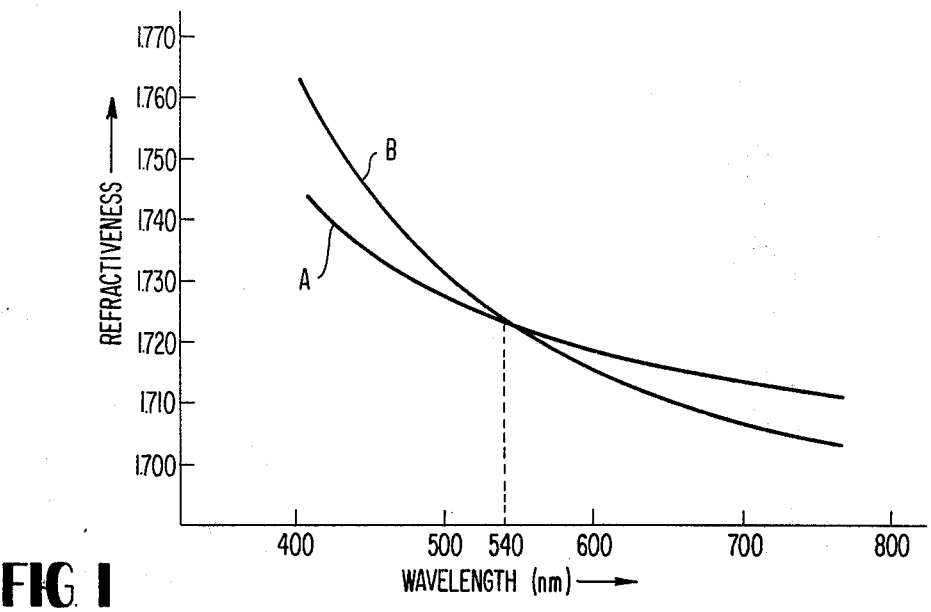
FIG. 1 shows the refractive index-wavelength curves of the two optical glasses used in an Example of the production of a specific filter in accordance with the present invention.

The process for producing the special filter in accordance with the present invention fundamentally comprises hot pressing a mixture of particles of two glasses in vacuo for a short time under limited temperature and pressure conditions and annealing the composite to room temperature to thereby obtain a special filter comprising a glass composite wherein glass particles different from the glass matrix (hereinafter referred to as "dispersed glass" or "glass to be dispersed") are uniformly dispersed in the glass matrix.

When an intermediate glass layer is formed at the interface between the glass matrix and the dispersed glass upon hot pressing, the maximum percent transmission of the product is seriously reduced since the refractive index of the intermediate glass layer to light of the specific wavelength is different from that of the two glasses. As a result of various experiments, it has been found that, in order to prevent the formation of the intermediate glass layer, it is necessary to conduct hot pressing for a time within about 2 hours while maintaining the glass matrix and the dispersed glass in a viscous state and a solid state, respectively.

Therefore, of the two glasses constituting the special filter in accordance with the present invention, the one which has the lower softening point is used as the glass matrix and the other which has the higher softening point is used as the dispersed glass. The hot pressing temperature is limited to higher than the softening point of the glass matrix which generally has a softening point of about 400°C to 750°C, but lower than the softening point of the dispersed glass. The term "softening point" as used herein in the present invention means the yield point determined based on the thermal expansion curve of the glass, which corresponds to the temperature where the viscosity of the glass becomes $10^{11} - 10^{12}$ poise.

Also, if the dispersed glass is not completely and intimately wetted by the glass matrix, a void will be formed, resulting in a reduction in the maximum percent transmission due to the scattering of light. As a result of various experiments, it has been found that, in order to prevent the formation of this void, it is necessary to conduct the hot pressing in vacuo under the above-specified molding temperature and molding time conditions above-specified while applying a pressure of 50 to 3,000 kg/cm², preferably 300 to 2,000 kg/cm². If the pressure is less than 50 kg/cm², a void will remain at the interface between the two different glasses and, as a result, the maximum percent transmission of the filter will be reduced so much that it cannot be practically used. On the other hand, pressures higher than 3,000 kg/cm² provide no additional favorable influences on the properties of the filter, and hence such pressures are economically disadvantageous.

When the difference in the thermal expansion coefficient between the glass matrix and the dispersed glass is too great, such a great internal stress during the step of annealing the product to room temperature after hot pressing will be caused that the stress exceeds the breakage limit of the glasses and causes innumerable fine cracks in the product. This internal stress is never produced at a temperature higher than the transition point of the glass. Therefore, it is the difference in thermal expansion coefficient at temperatures lower than the transition point of the glass matrix that must be considered. In order to prevent the formation of these fine cracks, it is desirable to select and combine the two glasses so that the difference in thermal expansion coefficient therebetween is as small as possible. In general, the allowable difference in the thermal expansion coefficient is ± 20 percent.

The mechanism of the adhesion between the glass matrix particles and the dispersed glass fine particles can be explained as follows.

In the hot pressing in vacuo, the glass matrix particles are in a viscous state since the molding temperature is higher than the softening point of the glass matrix. Suitable vacuums are about $10^{-1}$ to $10^{-9}$ Torr, preferably $10^{-2}$ to $10^{-5}$ Torr. Therefore, the glass matrix particles are in intimate contact with each other and occupy the voids due to the applied pressure and, at the same time, they are brought into intimate contact with the dispersed glass fine particles. Thus, ultimately a void-free, uniform glass composite is formed.

Since optical glasses having various optical constants and thermal properties are commercially available, a special filter according to the process of the present invention can be easily obtained by suitably combining two optical glasses, the filter comprising a glass composite showing maximum percent transmission to, especially, visible light of the desired wavelength.

The present invention will now be illustrated in greater detail by reference to the following non-limiting examples of preferred embodiments of the present invention. Unless otherwise indicated all parts and percents are by weight.

EXAMPLE 1

In order to obtain a special filter comprising a glass composite showing a maximum percent transmission at around 540 nm, two commercially available optical glasses having the properties given in Table 1 (one being a highly refractive flint glass and the other being a lanthanum crown glass) were used.

Table 1

| Purpose of Use | | Glass Matrix | Dispersed Glass |
|---|---|---|---|
| Properties | Kind of Glass | Highly Refractive Flint Glass $SiO_2$-PbO-$Na_2O$-$K_2O$ | Lanthanum Crown Glass $SiO_2$-$B_2O_3$-$La_2O_3$-$Ta_2O_5$-$ZrO_2$-BaO |
| Refractive Indices to Various Wave Lengths | nA' (768.2 nm) | 1.70278 | 1.71077 |
| | nC (656.3 nm) | 1.71032 | 1.71567 |
| | nD (589.3 nm) | 1.71715 | 1.71987 |
| | ne (546.1 nm) | 1.72311 | 1.72341 |
| | nF (486.1 nm) | 1.73463 | 1.72998 |
| | ng (435.8 nm) | 1.74916 | 1.73787 |
| | nh (404.7 nm) | 1.76201 | 1.74448 |
| Abbe's Number ($\gamma d$) | | 29.5 | 50.3 |
| Transition Point (°C) | | 418 | 665 |
| Softening Point (°C) | | 450 | 686 |
| Coefficient of Linear Expansion | | $92 \times 10^{-7}$ | $78 \times 10^{-7}$ |
| Specific Gravity | | 4.46 | 3.99 |

Figure 2:
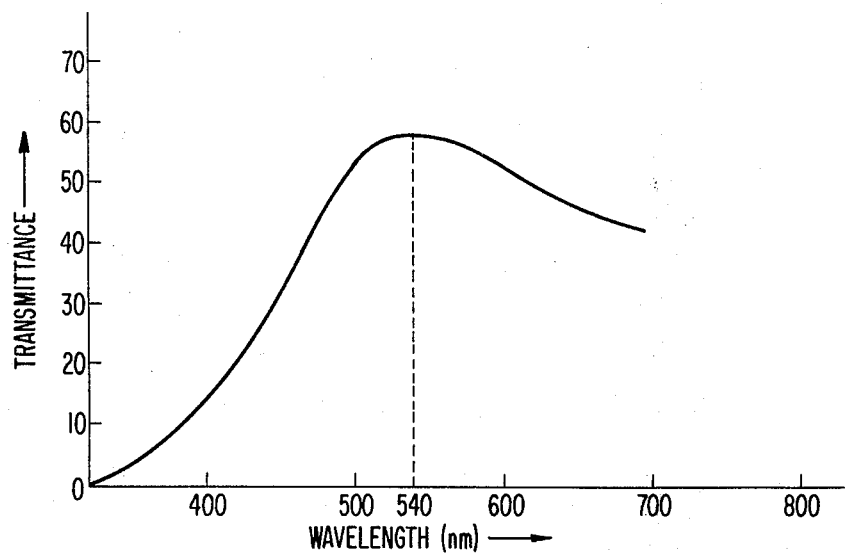
FIG. 2 shows the percent transmission-wavelength curve of the special filter comprising the glass composite obtained in Example 1.

Refractive index-wavelength curves of the glass matrix and the dispersed glass are shown in FIG. 1, with Curve A, showing the refractive index-wavelength curve of the glass matrix, and Curve B, showing the refractive index-wavelength curve of the dispersed glass, crossing each other at about 540 nm, at which point the two refractive indices become equal to each other. The glass matrix was pulverized to less than 325 mesh, and the glass to be dispersed was pulverized to 115 to 200 mesh. Thereafter, the glass matrix powder and the dispersed glass fine particles were weighed out in a volume ratio of 90:10 and were thoroughly and uniformly mixed using a mixer. 15 Grams of the resulting mixture was hot pressing in vacuo ($10^{-3}$ Torr) at a temperature of 580°C under a pressure of 500 kg/cm² for 30 minutes. Then, the resulting molding was annealed to 320°C at a rate of 30°C/hr followed by allowing the product to cool in the furnace. Thus, a disc of about 30 mm in diameter and about 5 mm in thickness was obtained. Both surfaces of the thus obtained disc comprising the glass composite was ground to a thickness of 2 mm. The spectral percent transmission of the disc was measured. As is shown in FIG. 2, this disc was a green filter having maximum percent transmission at a wavelength of about 540 nm.

EXAMPLE 2

In a manner similar to Example 1 except for adjusting the hot pressing temperature to 700°C which is higher than the softening point of the glass to be dispersed, a product comprising a glass composite was obtained. However, this product appeared milk white and the percent transmission to visible light was almost zero. Therefore, this product could not be practically used.

While the invention has been described in detail and with reference to specific embodiments thereof, it will be apparent to one skilled in the art that various changes and modifications can be made therein without departing from the spirit and scope thereof.

What is claimed is:

1. A process for producing a special filter comprising a glass composite, said composite comprising a glass matrix, which is solid at room temperature, containing dispersed therein fine particles of another glass, which is solid at room temperature, whose refractive index is the same as that of said glass matrix at a specific wavelength but different from that of said glass matrix at other wavelengths, and showing a maximum percent transmission at said specific wavelength, said glass dispersed in said glass matrix having a softening point higher than that of said glass matrix which comprises hot pressing a mixture of particles of said glasses in vacuo at a temperature higher than the softening point of said glass matrix but lower than the softening point of said dispersed glass, under a pressure of 50 to 3,000 kg/cm².

2. The process of claim 1, wherein said hot pressing is at a pressure of 300 to 2,000 kg/cm².

3. The process of claim 1, wherein said the difference in the thermal expansion coefficient between the glass of said glass matrix and the glass of said dispersed glass is about 20 percent or less.

4. The process of claim 1, wherein the glass of said glass matrix is a $SiO_2$-PbO-$Na_2O$-$K_2O$ glass and the glass of said dispersed glass is a $SiO_2$-$B_2O_3$-$La_2O_3$-$Ta_2O_5$-$ZrO_2$-BaO glass.

5. The process of claim 1, where said vacuum ranges from about $10^{-1}$ to $10^{-9}$ Torr.

* * * * *